(12) United States Patent
Gubeskys et al.

(10) Patent No.: US 7,630,429 B2
(45) Date of Patent: Dec. 8, 2009

(54) EQUALIZER CO-EFFICIENT GENERATION APPARATUS AND METHOD THEREFOR

(75) Inventors: Arik Gubeskys, Hod Hasharon (IL); Amir Chass, Ramat-Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 542 days.

(21) Appl. No.: 11/147,969

(22) Filed: Jun. 8, 2005

(65) Prior Publication Data

US 2005/0271124 A1 Dec. 8, 2005

(30) Foreign Application Priority Data

Jun. 8, 2004 (EP) .................... 04013517

(51) Int. Cl.
*H04B 1/00* (2006.01)

(52) U.S. Cl. .................. 375/150; 375/130; 375/147; 375/140

(58) Field of Classification Search .......... 375/130, 375/150, 147, 140
See application file for complete search history.

(56) References Cited

U.S. PATENT DOCUMENTS

| | | | |
|---|---|---|---|
| 6,438,156 | B1 | 8/2002 | Ghobrial et al. |
| 2003/0153322 | A1* | 8/2003 | Burke et al. ............. 455/450 |
| 2004/0125865 | A1* | 7/2004 | Frank et al. ............. 375/148 |
| 2004/0179584 | A1* | 9/2004 | Bilgic et al. ............. 375/148 |
| 2005/0201326 | A1* | 9/2005 | Lakkis ............. 370/329 |

OTHER PUBLICATIONS

Zhu et al, "Recursive least squares with linear constraints", Proceedings of the 38$^{th}$ IEEE Conference, Phoenix, AZ, USA, Dec. 1999.
Ghosh et al; "Adaptive Chip-Equalizers for Synchronous DS-CDMA Systems with Pilot Sequences"; IEEE GlobeCOM 2001.
Y. Liu, et al. "A New Method of Joint Filterbank Precoders and Decision Feedback Equalizers Optimization Over Dispersive Channels", University of Electronic Science and Technology of China, IEEE, pp. 528-531, Jul. 2001.
A. Reial, et al. "Transmitter-Based Equalization for Wireless LAN's", Wireless Personal Communications 20: 1-20, 2002 Kluwer Academic Publishers, sponsored by IBM Micro-Electronics Division, Rayleigh, NC, USA.
A. Morgado, et al. "Pre-equalization Technique for Interference Cancellation in the UMTS-TDD Downlink Channel", IEEE, pp. 878-881, Oct. 2001.
EPC Search Report, EPC Application No. 04013517, dated Nov. 16, 2004.
EPC Office Action - Rejection, dated Oct. 27, 2006.
EPC Office Action - Rejection, dated May 11, 2007.
EPC Office Action - Rejection, dated Jan. 29, 2008.

* cited by examiner

*Primary Examiner*—Shuwang Liu
*Assistant Examiner*—Brian J Stevens

(57) ABSTRACT

Known chip equalizers for Wideband-Code Division Multiple Access (W-CDMA) employ a co-efficient calculator that implements a Minimum Mean Square Error (MMSE) solution to a least squares technique for obtaining equalizer coefficients in response to receipt of a pilot sequence. However, this solution results in an undesirably high processing overhead in downlink receivers operating in a W-CDMA communications system. Consequently, the present invention provides a computationally simpler technique to calculate equalizer coefficients by implementing a minimum-norm solution to the least squares problem.

24 Claims, 2 Drawing Sheets

US 7,630,429 B2

EQUALIZER CO-EFFICIENT GENERATION APPARATUS AND METHOD THEREFOR

FIELD OF THE INVENTION

The present invention relates to an apparatus for generating equalizer coefficients of the type, for example, used by receivers in spread spectrum communications systems, such as a Wideband-Code Division Multiple Access communications system. The present invention also relates to a method of generating the equalizer coefficients.

In the field of wireless communications, spread-spectrum communications systems, such as Code Division Multiple Access (CDMA) systems, are widely deployed in a number of communications applications. In particular, a variant of CDMA, known as Wideband-CDMA (W-CDMA), is employed in the third generation (3G) Universal Mobile Telecommunications System (UMTS).

In the UMTS, downlink receivers comprising an equalizer coupled to a de-spreader are known. For such receivers, an input of the equalizer is coupled to a source of chips, the source of chips also being coupled to a coefficient calculation unit. An output of the coefficient calculation unit is coupled to another input of the equalizer in order to set coefficients of the equalizer. An output of the equalizer is, of course, coupled to an input of the de-spreader.

Currently, terminals capable of operating in the UMTS are equipped with so-called "RAKE" receivers that comprise, as the coefficient calculation unit, an array of initial de-spreader "blocks" coupled to respective conjugator "blocks". However, a traditional RAKE receiver cannot provide adequate performance in the presence of severe Multiple Access Interference (MAI) and Inter-Symbol Interference (ISI).

The demand for enhanced CDMA downlink performance is constantly growing, particularly to support the forthcoming High Speed Data Packet Access (HSDPA) standard. Consequently, one known candidates to replace the RAKE receiver is a linear chip equalizer.

In this respect, "Data detection algorithms specifically designed for the downlink of CDMA mobile radio systems" (A. Klein, *Proc. IEEE VTC*, vol. 1, pp. 203-7, May 1997) discloses linear Zero-Forcing (ZF) and Minimum-Mean-Squared-Error (MMSE) equalizers for a CDMA downlink. In particular, this document discloses a symbol-level solution to the problem of optimization of a mean-squared-error for a de-spread user symbol.

A simpler approach is to consider a composite chip sequence, which is a sum of spread signals of all users in a cell, and solving ZF and MMSE problems at a chip level, as described in "Linear receiver for the DS-CDMA downlink exploiting orthogonality of spreading sequences" (I. Ghauri and D. T. M. Slock, Proc. 32nd Asilomar Conf. on Signals, Systems, and Computers, Pacific Grove, Calif., November 1998), "Multiple access interference suppression with linear chip equalizes in WCDMA downlink receivers" (K. Hooli, M. Latva-aho and M. Juntti, Proc. IEEE Int. Global Comm. GLOBECOM' 99, Rio de Janeiro, Brazil, December 1999, pp. 467-471), and "Simple MMSE equalizers for CDMA downlink to restore chip sequence: comparison to zero-forcing and RAKE" (T. P. Krauss, M. D. Zoltowski and G. Leus, Proc. ICASSP, vol. 5, Istanbul, Turkey, June 2000, pp. 2865-2868). Indeed, as disclosed in this latter document, a fairly simple solution can be obtained if a composite chip sequence is assumed to be independent and identically distributed. In such a case, no spreading/scrambling code information is needed and the coefficients of the linear equalizer are found using the channel response and the noise variance only. However, in reality the channel response is not known in a receiver, and so the most common approach is to use a training sequence for channel estimation and computation of equalizer coefficients. In this respect and in relation to the UMTS W-CDMA standard, a code-multiplexed pilot signal is used for the purpose of providing the training sequence either in block based or adaptive equalizer configuration, as is described in "Pilot-aided adaptive chip equalizer receiver for interference suppression in DS-CDMA forward link" (F. Petre, M. Moonen, M. Engels, B. Gyselinckx and H. De Man, Proc. IEEE VTC-Fall 2000, 2000, pp. 303-308.), "Semi-blind space-time chip equalizer receivers for WCDMA forward link with code-multiplexed pilot", Proc. Int. Conf. ASSP, Salt Lake City, Utah, May 2001, pp. 2245-2248), and "Adaptive chip-equalizers for synchronous DS-CDMA systems with pilot sequences", GLOBECOM '01, Vol. 6, pages 25 to 29, November 2001).

However, the above examples of linear equalizers are processing intensive and so result in significantly more complex apparatus than the traditional RAKE receivers in order to achieve the required improvement in performance over the RAKE receivers. Consequently, such equalizers are relatively expensive to produce as compared with RAKE receivers.

STATEMENT OF INVENTION

The present invention provides an apparatus for generating a coefficient for an equalizer, a spread-spectrum receiver, a communications system, a method of generating a coefficient for an equalizer and a computer program element as described in the accompanying claims.

It is thus possible to provide a method and apparatus for calculating an equalizer coefficient that employs a solution for an underdetermined least squares problem that needs to be solved to calculate the equalizer coefficient. Consequently, calculation of correlation between symbols is needed. It is therefore possible to vary the number of symbols used in the correlation calculation so as to provide a trade-off between computation complexity and performance of a receiver.

BRIEF DESCRIPTION OF THE DRAWINGS

At least one embodiment of the invention will now be described, by way of example only, with reference to the accompanying drawings.

DESCRIPTION OF PREFERRED EMBODIMENTS

In a Wideband-Code Division Multiple Access communications system, for example a Universal Mobile Telecommunications System (UMTS), at least one node B (not shown) is capable of communicating with a User Equipment (UE), for example a mobile subscriber handset (not shown).

As much of the UE does not relate directly to the invention, for the sake of clarity and ease of understanding, the following part of this description will be confined to a downlink receiver of the UE.

Figure 1:
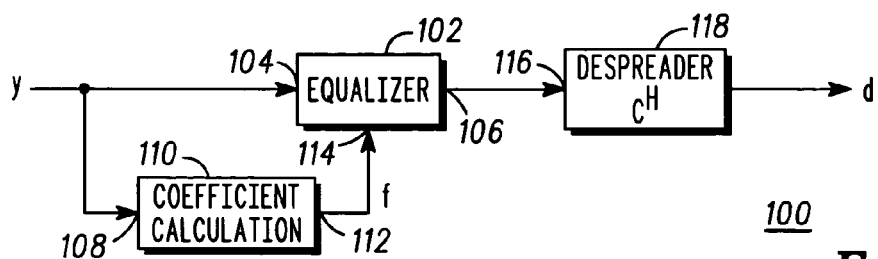
FIG. 1 is a schematic diagram of a downlink receiver.

Referring to FIG. 1, the downlink receiver 100 comprises an equalizer 102 having a first input 104 and an output 106. The first input 104 of the equalizer 102 is coupled to, in this example, an analog-to-digital converter (not shown) of the receiver that provides samples of received chips, and an input 108 of a coefficient calculation entity 110. An output 112 of the coefficient calculation entity 110 is coupled to a second input 114 of the equalizer 102. The output 106 of the equalizer 102 is coupled to an input 116 of a de-spreader unit 118.

By using a predetermined sequence of pilot symbols, expressed as a vector of pilot symbols $\bar{p}$, corresponding to a vector of received pilot chips, $\bar{y}$, the coefficient calculation unit 110 solves a least squares minimization problem of the form of the following equation in order to determine an equalizer coefficient vector, $\bar{f}$:

$$C_p^H Y \bar{f} = \bar{p} \quad (1)$$

where: $C_p^H Y$ is a matrix of received symbols corresponding to the pilot symbols, Y being a Toeplitz convolution matrix based upon the vector of received pilot chips, $\bar{y}$, and $C_p^H$ being a Hermitian matrix of a pilot spreading code.

Figure 2:
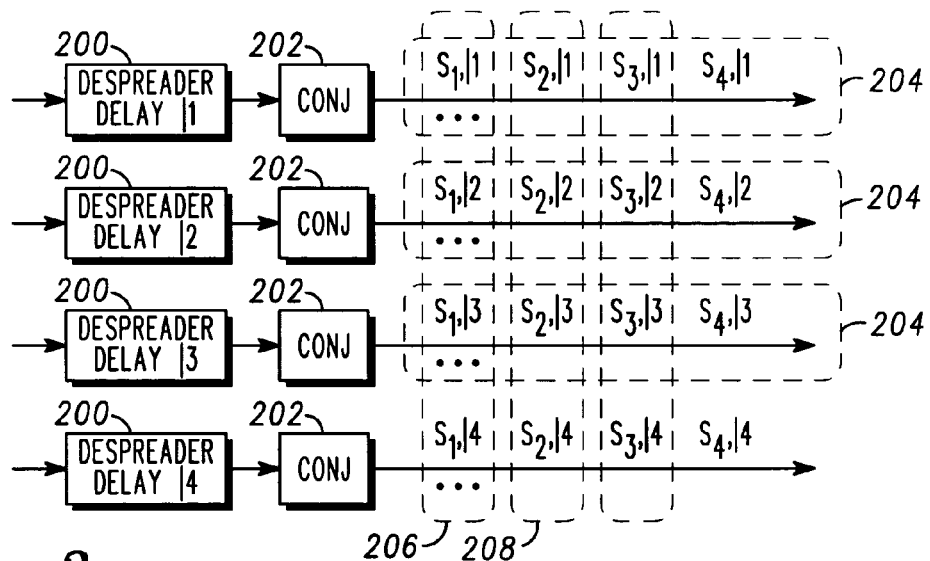
FIG. 2 is a schematic diagram of correlation between symbols of time-delayed streams of de-spread symbols constituting an embodiment of the invention.
Figure 3:
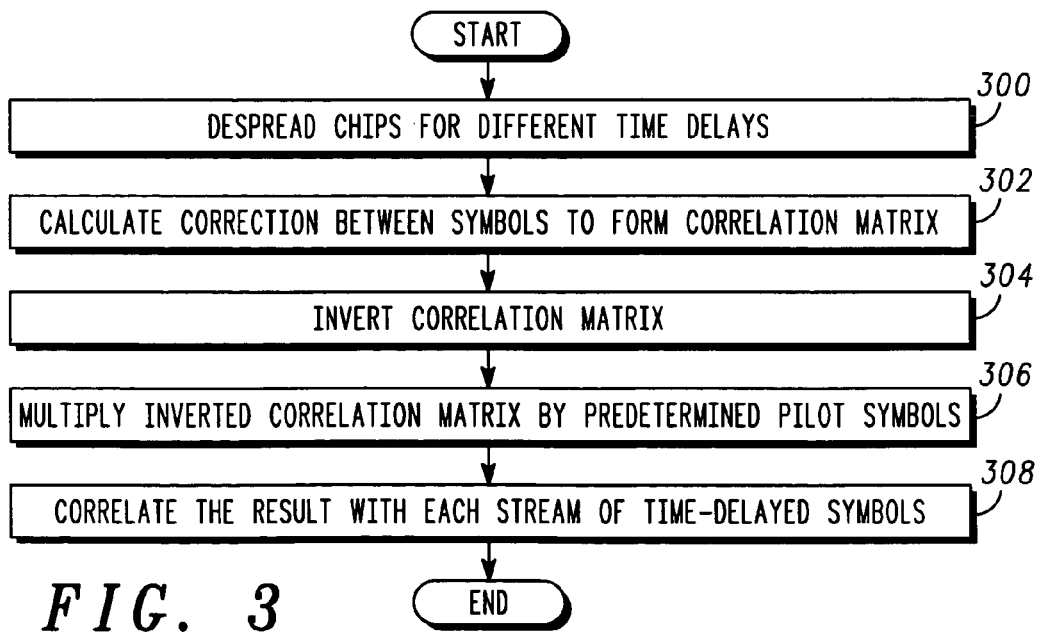
FIG. 3 is a flow diagram for use with the apparatus of FIGS. 1 and 2.

Referring to FIGS. 2 and 3, received signal data corresponding to the matrix of received symbols $C_p^H Y$ is generated by providing a plurality de-spreaders 200 for a respective plurality of time-delayed taps (not shown), the plurality of de-spreaders 200 being respectively coupled to a plurality of conjugator blocks 202 (Step 300). The plurality of time-delayed de-spreaders 200 therefore correspond to, for example, a first delay 11, a second delay 12, a third delay 13, and a fourth delay 14; the time delays used can be any suitable set of time delays, including a time delay of zero. The plurality of time-delayed de-spreaders 200 in combination with the conjugator blocks 202 generate respective streams of despread chips, or symbols 204, that constitute the received signal data corresponding to the matrix of received symbols $C_p^H Y$.

The coefficient calculation unit 110 then generates (Step 302) a correlation matrix $C_p^H Y Y^H C_p$, hereinafter referred to as the correlation matrix R, and an inverse (Step 304) of the correlation matrix $(C_p^H Y Y^H C_p)^{-1}$.

The product of the inverted correlation matrix, $R^{-1}$, and the vector of the predetermined sequence pilot symbols, $\bar{p}$, is then calculated (Step 306). A further correlation of each of the plurality of time-delayed streams of symbols 204 with the product, $R^{-1}\bar{p}$, is then calculated (Step 308) to obtain the solution to equation (1) above and hence equalizer coefficient vector $\bar{f}$.

The above described steps correspond to a solution to the least squares minimization problem of equation (1). However, whereas known techniques for solving equation (1) compute equalizer coefficients by finding a minimum mean squared error solution to an over-determined case of the least squares problem, the above steps correspond to an underdetermined case of the least squares minimization problem, a minimum-norm solution to the least squares minimization problem being employed to determine the equalize coefficient vector, $\bar{f}$. Consequently, correlation between symbols of the plurality of time-delayed streams of symbols is calculated instead of correlation between so-called "fingers" or each of the plurality of time-delayed streams of symbols 204. Hence, the equalizer coefficient vector, $\bar{f}$, can be expressed as:

$$\bar{f} = Y^H C (C^H Y Y^H C)^{-1} \bar{p} \quad (2)$$

Determination of the equalizer coefficient vector, $\bar{f}$, in this way requires correlation between a first set of time-delayed symbols 206 spanning a number of the plurality of streams of symbols 204 and a second set of time-delayed symbols 208 spanning the number of the plurality of streams of symbols 204. In this respect, each symbol of the first set of symbols 206 respectively correspond to a like position within the number of the plurality of streams 204. Similarly, each symbol of the second set 208 of symbols respectively corresponds to a like position within the number of the plurality of streams 204. The correlation between symbols can be expressed as:

$$\langle s_k, s_m \rangle = \sum_l s_{k,l} s_{m,l}^* \quad (3)$$

Consequently, the number of symbols used to calculate the correlation can be varied. Therefore, whilst a matrix representation for the correlation matrix, R, is:

$$C_p^H Y Y^H C_p = \begin{pmatrix} \langle s_1, s_1 \rangle & \langle s, s_2 \rangle & \dots & \langle s_1, s_B \rangle \\ \langle s_2, s_1 \rangle & \langle s_2, s_2 \rangle & & \\ \vdots & & & \\ \langle s_B, s_1 \rangle & & & \end{pmatrix} \quad (4)$$

where B is the size of a block of symbols used for the calculation of the correlation between the symbols, the size of the block of symbols B can be selected depending upon the performance and processing complexity requirement of the receiver.

Clearly, any non-trivial size of the block of symbols, i.e. not a block containing a single symbol as this corresponds to a RAKE solution, can be employed, but the larger the size of the block, the more the processing complexity approaches that of existing MMSE-based equalizer coefficient calculation units 110.

Taking B=2 as an exemplary block size, an expression for the inverse of correlation matrix, R, is given as:

$$C_p^H Y Y^H C_p \propto \begin{pmatrix} \langle s_1, s_2 \rangle & -\langle s_1, s_2 \rangle \\ -\langle s_2, s_1 \rangle & \langle s_2, s_1 \rangle \end{pmatrix} \quad (5)$$

By substituting equation (4) into equation (2) above, an expression for an equalizer coefficient, $f_l$, is obtained for a given time delay, l:

$$f_l \propto [s_{1,l}^* \langle s_2, s_2 \rangle - s_{2,l}^* \langle s_2, s_1 \rangle] \bar{p}_1 - [s_{2,l}^* \langle s_1, s_1 \rangle - s_{1,l}^* \langle s_1, s_2 \rangle] \bar{p}_2 \quad (6)$$

Further, equation (5) can be simplified, because for W-CDMA the first and second pilot symbols of the pilot sequence, $\bar{p}$, are identical, and so equation (5) becomes:

$$f_l \propto s_{1,l}^* \langle s_2 - s_1, s_2 \rangle + s_{2,l}^* \langle s_1 - s_2, s_1 \rangle \quad (7)$$

From equation (6), it can be seen that a matrix version of the expression for the equalizer coefficient, $f_l$, is not required.

Figure 4:
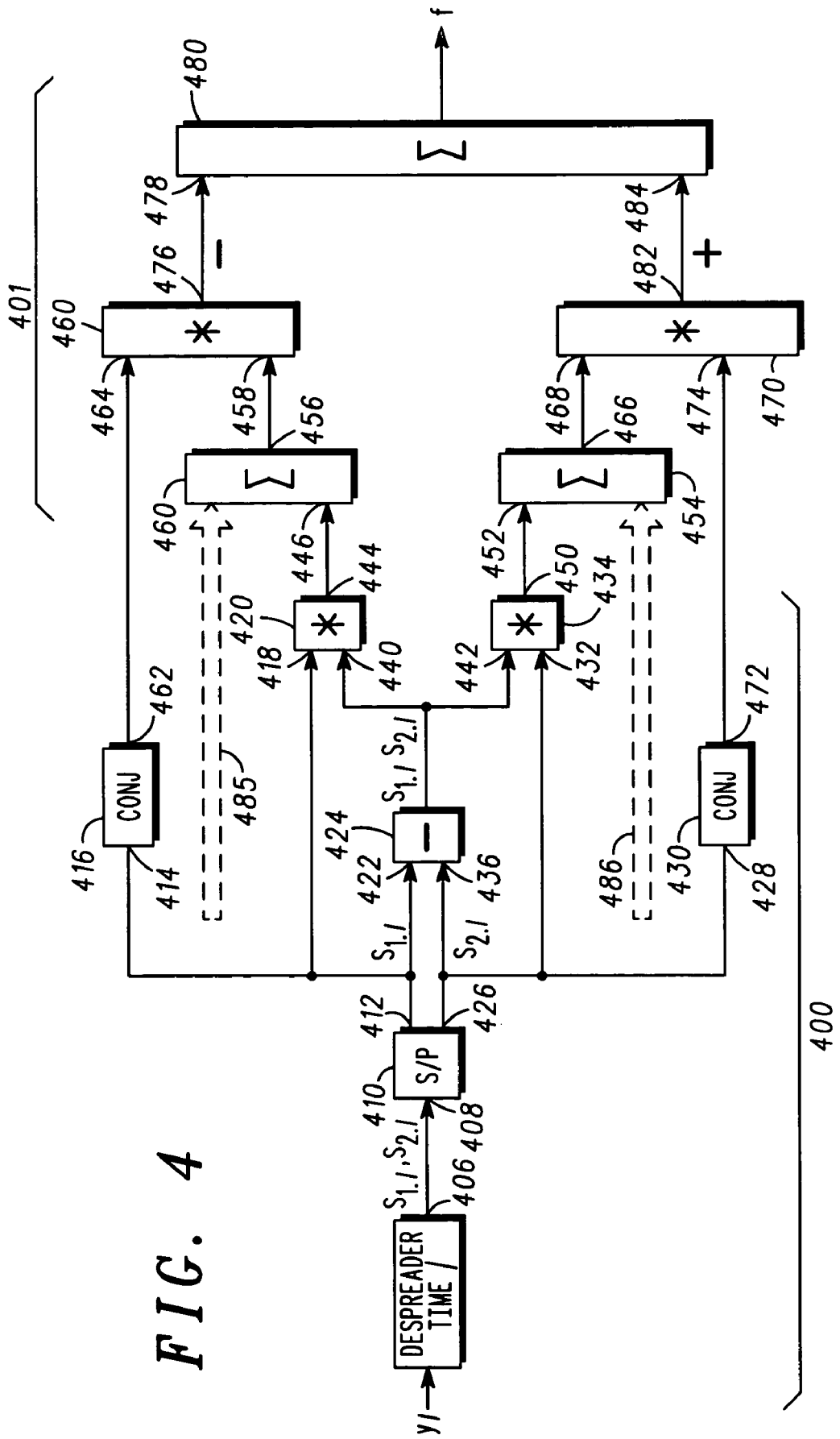
FIG. 4 is a schematic diagram of an apparatus for calculating a coefficient of an equalizer constituting another embodiment of the invention.

Referring to FIG. 4, the coefficient calculator unit 110 supports a plurality of coefficient calculation fingers, each coefficient calculation finger 400 corresponding to a respective time delay, l, and being coupled to a common processing arrangement 401. Each coefficient calculation finger 400 comprises a de-spreader 402 for the respective time delay, l, the de-spreader 402 having an input 404 for receiving a time-delayed stream of chips, $y_l$. Although not shown, the delay to the stream of chips can be provided by the use of a time-delay tap known in the art. An output 406 of the de-spreader 402 is coupled to an input 408 of a serial-to-parallel converter 410. A first output 412 of the serial-to-parallel converter 410 is coupled to an input 414 of a first complex conjugator 416. The first output 412 of the serial-to-parallel converter 410 is also coupled to a first input 418 of a first multiplication unit 420 and a first input 422 of a subtraction unit 424.

A second output 426 of the serial-to-parallel converter 410 is coupled to an input 428 of a second complex conjugator 430, as well as a first input 432 of a second multiplication unit 434 and a second input 436 of the subtraction unit 424. An output 438 of the subtraction unit 424 is coupled to a second input 440 of the first multiplication unit 420 and a second input 442 of the second multiplication unit 434.

With respect to the common processing arrangement 401, an output 444 of the first multiplication unit 420 is coupled to an input 446 of a first shared summation unit 448, the first shared summation unit 448 being coupled to other first multiplication units (not shown) of other coefficient calculation fingers (not shown) included in the coefficient calculation unit 110. Similarly, an output 450 of the second multiplication unit 434 is coupled to an input 452 of a second shared summation unit 454, the second shared summation unit 454 being coupled to other second multiplication units (not shown) of other coefficient calculation fingers (not shown) included in the coefficient calculation unit 110.

An output 456 of the first shared summation unit 448 is coupled to a first input 458 of a first shared multiplication unit 460, an output 462 of the first complex conjugator 416 being coupled to a second input 464 of the first shared multiplication unit 460. Similarly, an output 466 of the second shared summation unit 454 is coupled to a first input 468 of a second shared multiplication unit 470, an output 472 of the second complex conjugator 430 being coupled to a second input 474 of the second shared multiplication unit 470.

An output 476 of the first shared multiplication unit 460 is coupled to an inverting input 478 of a final summation unit 480. An output 482 of the second shared multiplication unit 470 is coupled to a non-inverting input 484 of the final summation unit 480. An output 482 of the final summation unit 480 is coupled to the second input 114 of the equalizer 102.

In operation, a stream of chips $\bar{y}_l$ are received by de-spreader 402 at the input 404 of the de-spreader 402, the stream of chips being delayed by the time delay, l. The de-spreader 402 processes the received stream of chips $\bar{y}_l$, and generates a corresponding stream of symbols, $\bar{s}_l$, the stream of symbols also being delayed by the time delay, l.

Thereafter, the stream of symbols, $\bar{s}_l$, is processed in pairs of symbols. For example, a first pair of time-delayed symbols $s_{1,l}, s_{2,l}$ comprising a first symbol $s_{1,l}$ and a second symbol $s_{2,l}$ are directed onto separate paths by the serial-to-parallel converter 410, the first symbol $s_{1,l}$ being provided at the first output 412 of the serial-to-parallel converter 410 and the second symbol $s_{2,l}$ being provided at the second output 426 of the serial-to-parallel converter 410. Consequently, the first complex conjugator 416, the first multiplication unit 420, and the subtraction unit 424 each receive the first symbol $s_{1,l}$. Similarly, the second complex conjugator 430, the second multiplication unit 434 and the subtraction unit 424 each receive the second symbol $s_{2,l}$.

As a result of receiving the first and second symbols $s_{1,l}, s_{2,l}$ the subtraction unit 424 calculates the difference of the first and second symbols solo $s_{1,l}, s_{2,l}$ $(s_{1,l}-s_{2,l})$ and provides the difference result at the output 438 of the subtraction unit 424. The difference result generated by the subtraction unit 424 is received by the first and second multiplication units 420, 434, whereupon the first multiplication unit 420 calculates a first product $(s_{1,l}(s_{1,l}-s_{2,l}))$ of the difference result of the subtraction unit 424 and the first symbol $s_{1,l}$ provided by the serial-to-parallel converter 410. Similarly, the second multiplication unit 434 calculates a second product $(s_{2,l}(s_{1,l}-s_{2,l}))$ of the difference result of the subtraction unit 424 and the second symbol $s_{2,l}$ provided by the serial-to-parallel converter 410.

The output 444 of the first multiplication unit 420 then provides the first product $(s_{1,l}(s_{1,l}-s_{2,l}))$ calculated by the first multiplication unit 420 to the first shared summation unit 448. Similarly, the second multiplication unit 434 provides the second product $(s_{2,l}(s_{1,l}-s_{2,l}))$ calculated by the second multiplication unit 434 to the second shared summation unit 454.

The first and second shared summation units 448, 454 also receive product calculations 485, 486 generated by first and second multiplication units (not shown) of other calculation fingers, respectively, in respect of other streams of time-delayed chips.

Thereafter, the respective sums calculated by the first shared summation unit 448 and the second shared summation unit 454 of all the products calculated by the first and second multiplication units of the coefficient calculation unit 110 are respectively received by the first shared multiplication unit 460 and the second shared multiplication unit 470. The first shared multiplication unit 460 calculates a product of the sum generated by the first shared summation unit 448 and the complex conjugate of the first symbol $s_{1,l}$ generated by the first complex conjugator 416. Similarly, the second shared multiplication unit 470 calculates a product of the sum generated by the second shared summation unit 454 and the complex conjugate of the second symbol $s_{2,l}$ generated by the second complex conjugator 430. Subsequently, the products calculated by the first and second shared multiplication units 460, 470 are summed by the final summation unit 480 to yield the equalizer coefficient $f_l$ for the time delay, l.

It should be appreciated that the arrangement described above in relation to FIG. 4 is an exemplary arrangement to support the equation (6) above. Consequently, it should be understood that other, more complex, arrangements can be realised to support more complex minimum-norm solutions to the least squares problem described above.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. An apparatus for generating a coefficient for an equalizer, the apparatus comprising a receiver and a processing arrangement capable of solving a least squares problem for determining the equalizer coefficient using a received signal corresponding to at least one predetermined symbol sequence, the at least one predetermined symbol sequence and a predetermined spreading code associated with the at least one predetermined symbol sequence, wherein the least squares problem is an underdetermined least squares problem, and the processing arrangement employs a minimum-norm solution to the signal received by the receiver to determine the equalizer coefficient, the minimum-norm solution being:

$$\bar{f} = Y^H C (C^H Y Y^H C)^{-1} \bar{p},$$

where $\bar{f}$ is the plurality of equalizer coefficients, $(C^H YY^H C)^{-1}$ is an inverse of a correlation matrix, $C^H$ is a Hermitian matrix of the predetermined spreading code, and Y is a Toeplitz convolution matrix based upon a vector of received chips, $\bar{Y}$, corresponding to the at least one predetermined symbol sequence, $\bar{P}$.

2. An apparatus as claimed in claim 1, wherein the at least one predetermined symbol sequence is a pilot sequence, and the predetermined spreading code is a pilot spreading code.

3. An apparatus as claimed in claim 1, the processing arrangement comprising:
   at least one de-spreader capable of generating a plurality of streams of symbols, each stream being of different delays and corresponding to a correlation matrix of symbols;
   a correlator capable of generating correlation data corresponding to a correlation matrix using at least part of the plurality of time-delayed streams of symbols; and
   a signal processing arrangement to determine a minimum norm value of the equalizer coefficient; wherein
   the correlation data is arranged, when in use, so as to be compatible with the determination of the minimum-norm value.

4. An apparatus as claimed in claim 3, wherein the correlation data corresponds to correlation between a first set of time-delayed symbols spanning a number of the plurality of streams of symbols and a second set of time-delayed symbols spanning the number of the plurality of streams of symbols.

5. An apparatus as claimed in claim 4, wherein each symbol of the first set of symbols respectively correspond to a like position within the number of the plurality of streams.

6. An apparatus as claimed in claim 4, wherein each symbol of the second set of symbols respectively correspond to a like position within the number of the plurality of streams.

7. An apparatus as claimed in claim 3, wherein the signal processing arrangement is capable of calculating the inverse of the correlation matrix.

8. An apparatus as claimed in claim 7, wherein the signal processing arrangement is capable of calculating a product of the inverse of the correlation matrix and a predetermined pilot signal.

9. An apparatus as claimed in claim 8, wherein the signal processing arrangement is capable of calculating a correlation between each of the plurality of streams of symbols and the calculated product of the inverse of the correlation matrix and the predetermined pilot signal, the calculated correlation corresponding to the coefficient for the equalizer.

10. An apparatus as claimed in claim 3, wherein the correlation data corresponds to a square correlation matrix of dimension between 2 and 4.

11. A spread-spectrum receiver comprising the apparatus for generating a coefficient for an equalizer as claimed in claim 1.

12. A communications system comprising the spread-spectrum receiver as claimed in claim 11.

13. An apparatus as claimed in claim 1 wherein the receiver is a third generation Frequency Division Duplex downlink receiver.

14. A method of generating a coefficient of an equalizer of a receiver, the method comprising:
   solving a least squares problem for determining the equalizer coefficient using a received signal corresponding to at least one predetermined sequence, the at least one predetermined sequence and a predetermined spreading code associated with the at least one predetermined sequence; and
   employing a minimum-norm solution to determine the equalizer coefficient; wherein the least squares problem is an underdetermined least squares problem, and the minimum-norm solution is:

$$\bar{f} = Y^H C (C^H Y Y^H C)^{-1} \bar{P},$$

where $\bar{f}$ is the plurality of equalizer coefficients, $(C^H YY^H C)^{-1}$ is an inverse of a correlation matrix, $C^H$ is a Hermitian matrix of the predetermined spreading code, and Y is a Toeplitz convolution matrix based upon a vector of received chips, $\bar{Y}$, corresponding to the at least one predetermined symbol sequence, $\bar{P}$.

15. A method as claimed in claim 14, wherein the at least one predetermined symbol sequence is a pilot sequence, and the predetermined spreading code is a pilot spreading code.

16. A method as claimed in claim 14, the method further comprising:
   generating a plurality of streams of symbols by de-spreading a received pilot signal, each stream being of different delays and corresponding to a correlation matrix of symbols;
   generating correlation data corresponding to a correlation matrix using at least part of the plurality of time-delayed streams of symbols; and
   determining a minimum-norm value of the equalizer coefficient; wherein
   the correlation data is arranged so as to be compatible with the determination of the minimum-norm value.

17. A method as claimed in claim 16, wherein the correlation data corresponds to correlation between a first set of time-delayed symbols spanning a number of the plurality of streams of symbols and a second set of time-delayed symbols spanning the number of the plurality of streams of symbols.

18. A method as claimed in claim 17, wherein each symbol of the first set of symbols respectively correspond to a like position within the number of the plurality of streams.

19. A method as claimed in claim 17, wherein each symbol of the second set of symbols respectively correspond to a like position within the number of the plurality of streams.

20. A method as claimed in claim 16, further comprising: calculating the inverse of the correlation matrix.

21. A method as claimed in claim 20, further comprising: calculating a product of the inverse of the correlation matrix and a predetermined pilot signal.

22. A method as claimed in claim 21, wherein the signal processing arrangement is capable of calculating a correlation between each of the plurality of streams of symbols and the calculated product of the inverse of the correlation matrix and the predetermined pilot signal, the calculated correlation corresponding to the coefficient for the equalizer.

23. A method as claimed in claim 16, wherein the correlation data corresponds to a square correlation matrix of dimension between 2 and 4.

24. A method as claimed in claim 14 wherein the receiver is a third generation Frequency Division Duplex downlink receiver.

* * * * *